UNITED STATES PATENT OFFICE.

BARNABAS J. CASTERLINE, OF PORTLAND, OREGON, ASSIGNOR TO CASTERLINE CUTLERY COMPANY, OF PORTLAND, OREGON, A CORPORATION.

COMPOSITION OF MATTER EMPLOYED FOR HARDENING AND TEMPERING STEEL.

No. 879,518.     Specification of Letters Patent.     Patented Feb. 18, 1908.

Application filed June 13, 1907. Serial No. 378,729.

*To all whom it may concern:*

Be it known that I, BARNABAS J. CASTERLINE, a citizen of the United States, and resident of Portland, county of Multnomah, and State of Oregon, have invented certain new and useful Improvements in a Composition of Matter to be Employed for Hardening and Tempering Steel, of which the following is a specification.

This invention relates to a composition of matter to be employed for hardening and tempering steel; the object of the invention being to provide a composition of the character named which will impart to the steel a maximum degree of hardness without impairing its resiliency or malleability.

My composition consists of the following ingredients, combined in the proportions stated, viz.:

| | |
|---|---|
| Salt | 2 lbs. |
| Saltpeter | ¼ lb. |
| Carbonate of iron | ¼ lb. |
| Borax | ½ lb. |
| Wood alcohol | 15 pints. |
| Glycerin | 5 quarts. |
| Oil | 5 gallons. |

These ingredients are mingled by agitation, until a thoroughly homogeneous fluid compound is produced.

I may use any adaptable oil in the above named composition, either animal or vegetable, such as: linseed oil, cotton seed oil, China nut oil, sweet oil, fish oil, sperm oil and lard oil.

To use the composition as a means for hardening and tempering a given article of steel the same is first heated to a "cherry-red" heat; then immersed into the above named solution and kept submerged for the same length of time required to allow water to subside and discontinue bubbling when a piece of "cherry-red" heated steel is submerged therein; said period of time will be readily understood by those familiar with the art of tempering metals. After being allowed to cool in the solution for a period as stated above the article is coated with tallow and then heated slowly, by holding it over a slow fire, until drawn to the degree of malleability required, the period of time being varied according to the uses for which the article being tempered is intended.

Having thus described my invention, what I claim as new, and desire to secure by Letters Patent, is:—

1. The herein described composition of matter for hardening and tempering steel, consisting of the following ingredients, viz.: salt, saltpeter, carbonate of iron, borax, wood alcohol, glycerin and oil; substantially as described.

2. The herein described composition of matter for hardening and tempering steel consisting of the following ingredients, in the following relative proportions, viz.: of salt, two pounds; saltpeter, one quarter of a pound; carbonate of iron, one quarter of a pound; borax, one half of a pound; wood alcohol, fifteen pints; glycerin, five quarts; oil, five gallons.

In testimony that, I claim the foregoing as my invention, I have signed my name in presence of two witnesses, this 24th day of May 1907.

BARNABAS J. CASTERLINE.

Witnesses:
   M. J. CURTIS,
   FRANK MOTTER.